March 10, 1953 T. A. MAURY ET AL 2,630,977
WINDING MECHANISM FOR AUTOMATIC FISHING REELS
Filed Sept. 15, 1949 2 SHEETS—SHEET 1

INVENTOR.
Thomas A. Maury &
BY Alfred D. Maury
Bodell & Thompson
ATTORNEYS

March 10, 1953  T. A. MAURY ET AL  2,630,977
WINDING MECHANISM FOR AUTOMATIC FISHING REELS
Filed Sept. 15, 1949  2 SHEETS—SHEET 2

INVENTOR.
Thomas A. Maury &
Alfred D. Maury
BY Bodell & Thompson
ATTORNEYS

Patented Mar. 10, 1953

2,630,977

UNITED STATES PATENT OFFICE 2,630,977

WINDING MECHANISM FOR AUTOMATIC FISHING REELS

Thomas A. Maury, Herkimer, and Alfred D. Maury, Ilion, N. Y., assignors to Martin Automatic Fishing Reel Co., Inc., Mohawk, N. Y., a corporation of New York Application September 15, 1949, Serial No. 115,904

1 Claim. (Cl. 242—84.3)

This invention relates to spring winding mechanism for automatic fishing reels of the general type shown in Maury Patents 1,909,621, May 16, 1933; 2,175,756, October 10, 1939, and 2,301,732, November 10, 1942.

It has for its object an operator releasable over-running clutch mechanism, as distinguished from a ratchet mechanism, for normally preventing retrograde rotation of the spring winding drum and unloading of the spring, and more specifically a mechanism comprising a cam or clutch lever having friction surfaces for coacting with the winding drum which houses the spring, which lever is pivoted on an axis to a fixed support eccentric to the axis of the reel, or the spindle thereof, so that the friction surfaces have a camming or wedging action on the drum, the lever having a finger piece exposed on the periphery of the casing of the reel.

The invention consists in the novel features and in the combinations and constructions hereinafter set forth and claimed.

In describing this invention, reference is had to the accompanying drawings in which like characters designate corresponding parts in all the views.

Figure 1:
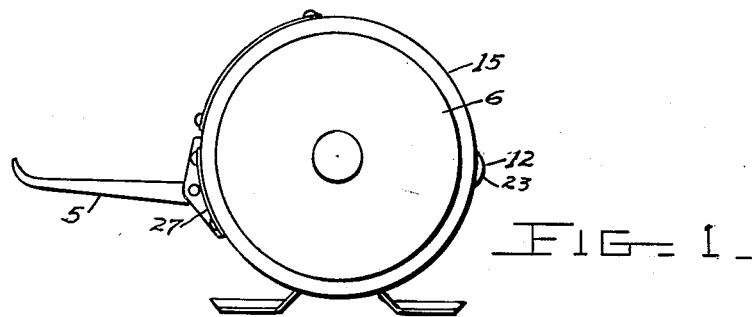
Figure 1 is a side elevation of the reel.
Figure 2:
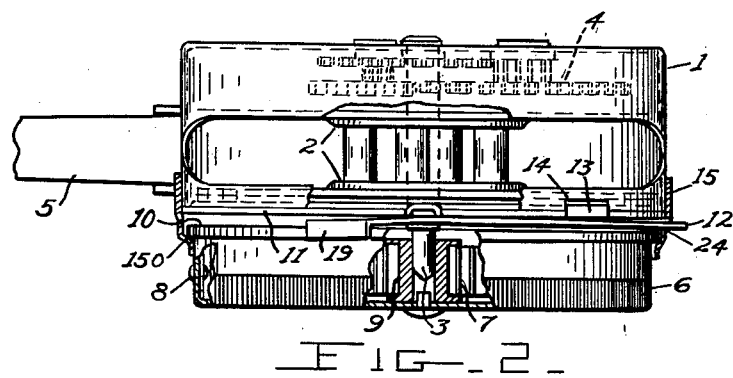
Figure 2 is an edge elevation of the reel looking down in Figure 1, partly broken away to show the assembly of the winding spring drum, the support for the friction or cam lever, and the casing of the reel.

The numeral 1 designates the body of the reel which is cylindrical in general form and in which is mounted a line reel or spool 2 on a spindle 3, the spindle extending axially out of the body beyond one side of the same, Figure 2. There is a train of suitable motion transmitting gearing as at 4, in Figure 2, between the spindle 3 and the spool reel 2, as shown in said patents.

5 designates the brake lever operable to retard the rotation of the spool under the pull of the fish on the line. The brake usually operates on a gear in the train of gears 4, as for instance, in Patent 2,175,756.

6 designates a winding drum in the form of a shallow cup, and 7 a plane spiral spring in the winding drum 6, the spring being anchored at 8 at its outer end to the cylindrical wall of the drum in any suitable manner and being anchored at 9 at its inner end to a hub on the spindle 3, Figure 2, the hub being rotatable with the spindle but being axially removable therefrom when the retaining ring, to be hereinafter mentioned, is removed. The drum has a peripheral flange 10 with which the retaining ring coacts.

The invention resides in an overrunning clutch mechanism operable to coact with the drum and hold the winding drum 6 from retrograde movement after each turn given it to wind the spring 7, and operator releasable to release the drum to untension or unload the spring.

Figure 3:
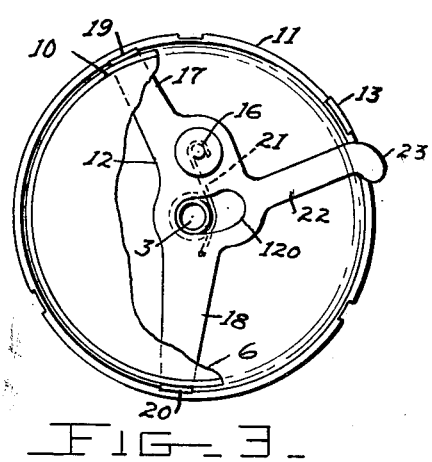
Figures 3 and 4 are face views of the cam lever, the support therefor, and the contiguous part of the spring drum showing the wedging operation of the friction shoes of the cam lever.
Figure 4:
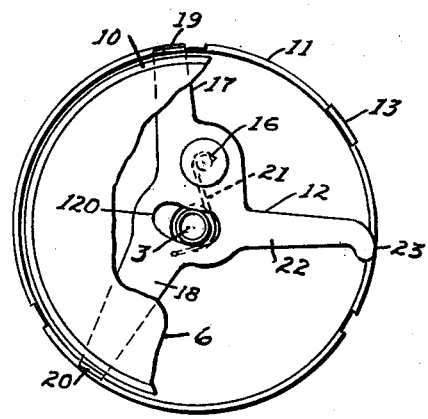

11 is a support in the form of a disk for the cam lever 12, Figures 3 and 4, constituting the subject matter of this invention. The support 11 is here shown as discoidal and interposed between the winding drum 6 and spring 7, and the opposing side of the casing 1. It is located relatively to the casing by a peripheral lug or shoulder 13 interfitting in a notch 14 formed in the opposing edge of the casing. This lug prevents the support and hence the lever from turning relatively to the casing under the influence of the winding drum 6.

15 is a retaining ring or collar having an internal flange 15a at its outer side which shoulders against the flange 10 of the winding drum and hence holds the drum from axial displacement. The lever 12 is here shown as pivoted at 16, Figures 3 and 4, to the disk 11 eccentric to the spindle 3 and has outwardly extending arms 17 and 18 formed with angularly extending brake shoes 19 and 20 which coact with the edge of the flange 10 to serve as a brake or wedge to hold the spring from reacting. The lever 11 is biased by a spring 21 in such direction as to cause the shoes 19, 20, to shift into a wedging position. The lever is also formed with an operating arm 22 having a finger piece 23 exposed on the peripheral surface of the casing or the retaining ring. The lever 12, which consists of three diverging arms, is formed with a slot 12a through which the spindle 3 extends. The lever arms 17, 18 diverge from each other at angles less than a straight angle or diameter of the supporting disk 11. Hence, the shoes at the ends of the arms normally tend to thrust the support 11 to the right, Figures 3 and 4, and wedge the disk 11 at its right edge against the flange 150 of the retaining ring.

Figure 5:
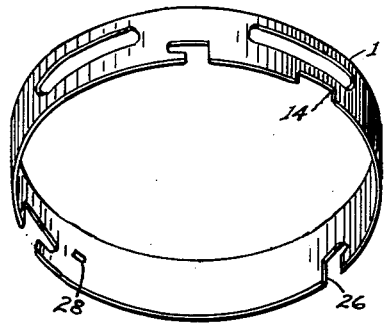
Figures 5 and 6 are fragmentary views showing the manner of interlocking the supporting disk for the cam lever and the contiguous portion of the casing to locate the cam lever and hold its support fixed relatively to the casing.
Figure 6:
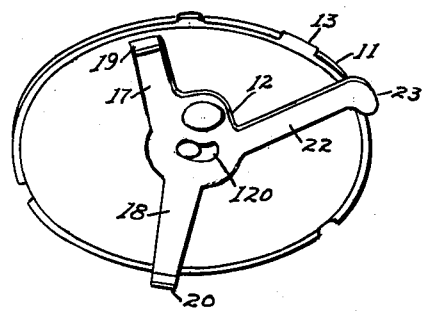
Figure 7:
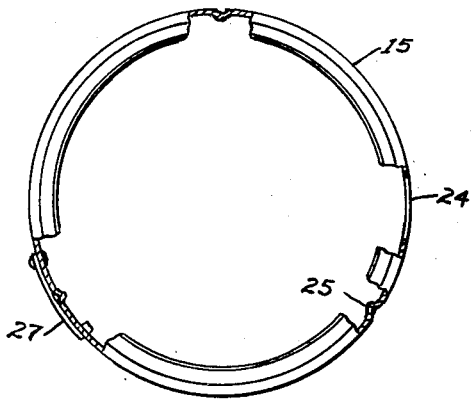
Figures 7 and 8 are fragmentary views of the retaining ring and the contiguous portion of the casing showing the means for securing the retaining ring to the casing.
Figure 8:
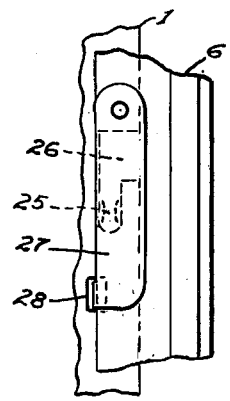

The retaining ring is formed with a slot 24, Figures 2 and 7, through which the finger piece is exposed on the outside of the reel. The retaining ring may be held in position in any suitable manner. It is here shown as interlocked with the casing by successive axial and partial turning movements to engage lugs as 25 on the ring in angular or bayonet joint slots 26, Figure 5, in the peripheral wall of the casing. A suitable spring catch 27, Figure 8, on the retaining ring is located to snap into a hole 28, Figure 8, in the casing when the bayonet joint is in interlocked position. This construction as to the bayonet joint and the snap catch forms no part of the invention.

The cam lever 12 is a form of over-running clutch coacting with the winding drum 6 to permit the drum to be turned to load the spring 7, and operator releasable to unload the spring.

The details of construction of the reel form no part of this invention. This invention relates solely to the cam lever over-running clutch, its support, and the location in the assembly.

What we claim is:

A winding mechanism for automatic fishing reels which comprises a cylindrical casing in which a rotatable spindle is mounted and on which the line reel is mounted, including a winding drum on one side of the casing, a plane spiral spring anchored at its outer end to the drum and at its inner end to a hub on the spindle and rotatable therewith, and an operator releasable over-running clutch mechanism for holding the drum from being turned by the spring in a retrograde direction, said mechanism comprising a supporting disk interlocked with the casing and located between the casing and the drum, and an over-running clutch carried by the disk and coacting with the drum, the clutch comprising a cam lever pivoted to the disk on one side thereof eccentric to the axis of the spindle, the lever having circumferentially spaced shoes located to frictionally engage a cylindrical surface of the drum to hold the drum from being actuated by the spring, the lever having a finger piece located outside of the casing to release the lever, the lever being spring biased to carry the friction shoes into frictional engagement with the drum.

THOMAS A. MAURY.
ALFRED D. MAURY.

REFERENCES CITED

The following references are of record in the file of this patent:

UNITED STATES PATENTS

| Number | Name | Date |
| --- | --- | --- |
| 1,813,275 | Burdick | July 7, 1931 |
| 1,964,998 | Perrine | July 3, 1934 |
| 2,148,185 | Blocker | Feb. 21, 1939 |